United States Patent
Hori et al.

(10) Patent No.: US 12,283,847 B2
(45) Date of Patent: Apr. 22, 2025

(54) ROTOR OF ROTARY ELECTRIC MACHINE, ROTARY ELECTRIC MACHINE AND ELECTRIC DRIVE DEVICE

(71) Applicant: Hitachi Astemo, Ltd., Hitachinaka (JP)

(72) Inventors: Masahiro Hori, Tokyo (JP); Masanori Sawahata, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 273 days.

(21) Appl. No.: 18/017,911

(22) PCT Filed: May 18, 2021

(86) PCT No.: PCT/JP2021/018748
§ 371 (c)(1),
(2) Date: Jan. 25, 2023

(87) PCT Pub. No.: WO2022/054339
PCT Pub. Date: Mar. 17, 2022

(65) Prior Publication Data
US 2023/0283125 A1 Sep. 7, 2023

(30) Foreign Application Priority Data
Sep. 9, 2020 (JP) ................................. 2020-151189

(51) Int. Cl.
*H02K 1/276* (2022.01)
*H02K 1/32* (2006.01)

(52) U.S. Cl.
CPC ............... *H02K 1/276* (2013.01); *H02K 1/32* (2013.01)

(58) Field of Classification Search
CPC ........ H02K 1/276; H02K 1/2766; H02K 1/27; H02K 1/32; H02K 1/22; H02K 1/279; H02K 9/19; H02K 21/14; H02K 21/12
See application file for complete search history.

(56) References Cited

U.S. PATENT DOCUMENTS

| 5,818,140 | A  | * | 10/1998 | Vagati | ................... | H02K 1/246 |
|           |    |   |         |        |                     | 310/152    |
| 7,436,095 | B2 | * | 10/2008 | Aydin  | ................... | H02K 1/278 |
|           |    |   |         |        |                     | 310/156.53 |
| 7,952,249 | B2 | * | 5/2011  | Kori   | ..................... | B60L 3/0061 |
|           |    |   |         |        |                     | 310/156.53 |
| 8,680,732 | B2 | * | 3/2014  | Kamei  | ................ | H02K 1/2766 |
|           |    |   |         |        |                     | 310/156.53 |

(Continued)

FOREIGN PATENT DOCUMENTS

| DE | 102017127611 A1 | * | 5/2018 | ............ H02K 1/274 |
| DE | 102018118327 A1 | * | 1/2020 | |

(Continued)

OTHER PUBLICATIONS

International Search Report with English translation issued in corresponding International Application No. PCT/JP2021/018748 dated Jul. 13, 2021.

*Primary Examiner* — Edgardo San Martin
(74) *Attorney, Agent, or Firm* — Foley & Lardner LLP

(57) ABSTRACT

Improving the coercive force of magnets used in a rotary electric machine by arranging magnets such that a q-axis side portion is located on an outer diameter side with respect to a d-axis side portion, and a magnet thickness Ti on an inner diameter side (d-axis side) of a rotor core is formed to be larger than a magnet thickness To on the outer diameter side (q-axis side) of the rotor core. An axial space is formed in the magnets such that when the lateral cross section of each of the magnets is divided into an outer diameter side region 112o and an inner diameter side region 112i in a manner that the lateral cross section areas are equal to each other with a circumference C around a rotation center as a boundary, and a space density of the axial space in the inner diameter side region 112i is larger than a space density of the axial space in the outer diameter side region 112o.

8 Claims, 10 Drawing Sheets

(56) References Cited

U.S. PATENT DOCUMENTS

| | | | |
|---|---|---|---|
| 8,860,278 B2 * | 10/2014 | Morgante | H02K 17/20 |
| | | | 310/201 |
| 9,899,902 B2 * | 2/2018 | Jurkovic | H02K 1/2766 |
| 10,116,178 B2 * | 10/2018 | Horii | H02K 1/28 |
| 10,530,205 B2 * | 1/2020 | Hattori | H02K 1/2766 |
| 10,658,895 B2 * | 5/2020 | Higashino | H02K 1/32 |
| 11,909,267 B2 * | 2/2024 | Makino | H02K 1/2766 |
| 2007/0096579 A1 * | 5/2007 | Aydin | H02K 1/278 |
| | | | 310/156.56 |
| 2011/0156521 A1 * | 6/2011 | Nagashima | H02K 1/2766 |
| | | | 310/156.28 |
| 2014/0265704 A1 * | 9/2014 | Rhyu | H02K 1/276 |
| | | | 310/156.38 |
| 2016/0380492 A1 | 12/2016 | Kawasaki et al. | |
| 2020/0136451 A1 * | 4/2020 | Zeichfüssl | F03D 9/25 |

FOREIGN PATENT DOCUMENTS

| | | | | |
|---|---|---|---|---|
| EP | 2015425 A2 * | 1/2009 | | H02K 1/276 |
| EP | 4084295 B1 * | 8/2024 | | H02K 1/22 |
| JP | 2003061282 A * | 2/2003 | | |
| JP | 3424765 B2 * | 7/2003 | | |
| JP | 2007006657 A * | 1/2007 | | |
| JP | 2009044893 A * | 2/2009 | | |
| JP | 2009268204 A * | 11/2009 | | |
| JP | 2009-303293 A | 12/2009 | | |
| JP | 2010246185 A * | 10/2010 | | |
| JP | 2014100048 A * | 5/2014 | | |
| JP | 6319973 B2 * | 5/2018 | | |
| JP | 2018183011 A * | 11/2018 | | |
| JP | 2019-058048 A | 4/2019 | | |
| JP | 2019-149859 A | 9/2019 | | |
| WO | WO-2015/104956 A1 | 7/2015 | | |

* cited by examiner

ROTOR OF ROTARY ELECTRIC MACHINE, ROTARY ELECTRIC MACHINE AND ELECTRIC DRIVE DEVICE

TECHNICAL FIELD

The present invention relates to a rotary electric machine including a rotor, the rotor, and an electric drive device using the rotary electric machine.

BACKGROUND ART

As background arts of the present technical field, a permanent magnet type rotary electric machine described in JP 2014-100048 A (PTL 1) and a rotary electric machine described in JP 2019-058048 A (PTL 2) are known.

The permanent magnet type rotary electric machine of PTL 1 includes a stator having a stator core; and a rotor having a rotor core, a plurality of magnet-embedding holes formed in the rotor core, and a plurality of permanent magnets arranged in a radial direction of the rotor core. The magnet-embedding hole has a center on a magnetic pole center axis of the rotor and is formed in an arc shape protruding toward the center side of the rotor. In the inner-peripheral-side magnet-embedding holes, the rotor core has two inner-peripheral-side support protrusions protruding into the magnet-embedding holes at both end portions away from the magnetic pole center axis, and a center locking structure portion provided in the inner-peripheral-side magnet-embedding hole on the magnetic pole center axis, and both end portions in the arc direction are engaged with and held by the center locking structure portion and one of the support protrusions (see abstract for the above). Furthermore, in PTL 1, the permanent magnet is divided into two at the center portion in the arc direction, and each of the two divided permanent magnets is formed such that the thickness (material thickness) on the side of the d-axis side end portion in the arc direction is larger with respect to the thickness (material thickness) on the side of the q-axis side end portion (see paragraph 0025 and FIG. 2).

In addition, in the rotary electric machine of PTL 2, each of the permanent magnets includes a pair of magnetic pole surfaces, a non-magnetic pole surface intersecting the pair of magnetic pole surfaces, and a through hole passing through the magnetic body and serving as a flow path of a refrigerant, and opening portions at both ends of the through hole are formed in the non-magnetic pole surface (see abstract and FIGS. 1 to 3). Further, PTL 2 describes a configuration in which the two permanent magnets are formed to have a constant thickness (material thickness) between the pair of magnetic pole surfaces and are arranged in a manner of forming a V shape which opens toward a gap side (the outer peripheral side of the rotor) between the stator and the rotor (see paragraph 0011 and FIG. 2). Furthermore, PTL 2 describes that it is preferable to form the through hole at a position where a distance d1 from the center of gravity of the magnetic pole surface to the center of gravity of the through hole is longer than the shortest distance d2 from the center of gravity of the through hole to the non-magnetic pole surface when viewed from a direction orthogonal to the magnetic pole surface (see paragraph 0018). In this case, the through hole is located on the end portion side of the magnetic pole surface (see paragraph 0018 and FIGS. 1 to 3).

CITATION LIST

Patent Literature

PTL 1: JP 2014-100048 A
PTL 2: JP 2019-058048 A

SUMMARY OF INVENTION

Technical Problem

PTL 1 describes a configuration in which the thickness (material thickness) on the side of the d-axis side end portion in the arc direction is larger with respect to the thickness (material thickness) on the side of the q-axis side end portion in each of the two divided permanent magnets, however, PTL 1 does not describe a configuration in which a space is provided inside the magnets.

On the other hand, in PTL 2, each magnet is formed to have a constant thickness (material thickness) between the pair of magnetic pole surfaces, and a space formed by the through hole is provided inside the magnet. In PTL 2, there is insufficient consideration for improving the coercive force of magnets. For example, in FIG. 2 of PTL 2, when a horizontal cross section of the magnet (a cross section perpendicular to the axial direction of the rotating shaft) is divided with a circle around the rotor center as a boundary in a manner that the horizontal cross section area on the inner diameter side and the horizontal cross section area on the outer diameter side are equal to each other, through holes having the same horizontal cross section area are formed one on each of the inner diameter side and the outer diameter side. In the portion of the magnet where the through hole is provided, the thickness (material thickness) of the magnet is reduced and demagnetization rate is increased. Therefore, in the magnet of PTL 2, improvement of the coercive force is limited.

An object of the present invention is to improve the coercive force of magnets used in the rotary electric machine.

Solution to Problem

In order to achieve the above-mentioned objective, the rotor of the rotary electric machine of the present invention includes: a magnet; and a rotor core that has a magnet housing portion which houses the magnet, wherein in a lateral cross section perpendicular to an axial direction of a rotating shaft,
the magnet is arranged such that a q-axis side portion is located on an outer diameter side with respect to a d-axis side portion, and a magnet thickness on an inner diameter side of the rotor core is formed to be larger than a magnet thickness on an outer diameter side of the rotor core,
an axial space formed along an axial direction is formed in the magnet, and
the axial space is formed such that when the lateral cross section of the magnet is divided into an outer diameter side region and an inner diameter side region in a manner that lateral cross section areas including a cross section of the axial space are equal to each other with a circumference around a rotation center as a boundary, a space density of the axial space in the inner diameter side region is larger than a space density of the axial space in the outer diameter side region.

Advantageous Effects of Invention

According to the present invention, it is possible to reduce a demagnetization rate of a magnet used in a rotary electric machine and to improve the coercive force of the magnet. Thus, it is possible to improve the output of the rotary electric machine.

Problems, configurations, and effects other than those described above will be clarified by the following description of embodiments.

DESCRIPTION OF EMBODIMENTS

Hereinafter, one embodiment of the present invention will be described with reference to the drawings. In the following description, a radial direction of a rotor 110 of a rotary electric machine 100 is denoted by r, an axial direction of a rotating shaft 101 of the rotor 110 (rotating shaft direction) is denoted by z, and a rotation direction of the rotor 110 is denoted by θ. In addition, an axis (central axis) passing through a center of the rotating shaft 101 is denoted by Ax. That is, the axial direction z is a direction along a central axis Ax of the rotating shaft 101. The radial direction r of the rotor 110 and the axial direction z of the rotating shaft may be referred to as "radial direction" and "axial direction", respectively. The rotation direction θ may be referred to as "circumferential direction" because the rotation direction θ coincides with a circumferential direction surrounding the central axis Ax.

Figure 2:
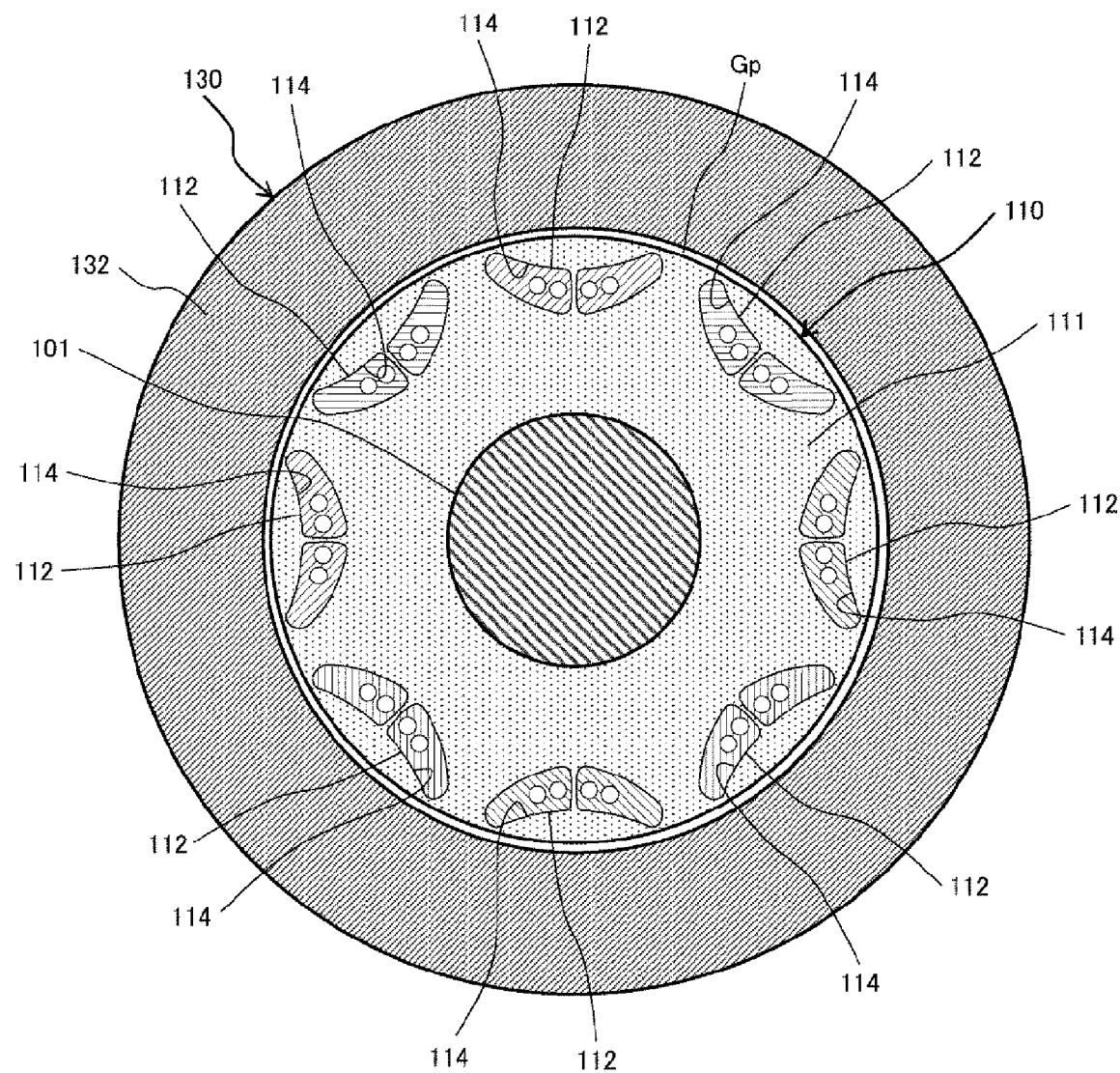
FIG. 2 is a cross-sectional view (lateral cross-sectional view), which is perpendicular to the central axis Ax, of the rotary electric machine 100 according to the present invention, and is a view showing an arrangement of a stator 130, a rotor 110, and a rotating shaft 101, which are main components.

In the following description, an up-down direction, a vertical direction, and a horizontal direction may be specified, but these directions are set based on FIG. 2 and do not specify an up-down direction, a vertical direction, and a horizontal direction in a mounting state of the rotary electric machine 100. Note that the vertical direction is a direction along the axial direction z.

A cross section obtained by cutting the rotary electric machine 100 in a lateral direction, that is, a cross section perpendicular to the central axis Ax (the axial direction z), is referred to as a lateral cross section, and a cross section obtained by cutting the rotary electric machine 100 in a longitudinal direction, that is, a cross section parallel to the central axis Ax, is referred to as a longitudinal cross section. Among vertical cross sections, a cross section which particularly includes the central axis Ax may be referred to as an r-z cross section.

Embodiment 1

The rotary electric machine 100 according to one embodiment of the present invention will be described with reference to FIGS. 1 and 2.

Figure 1:
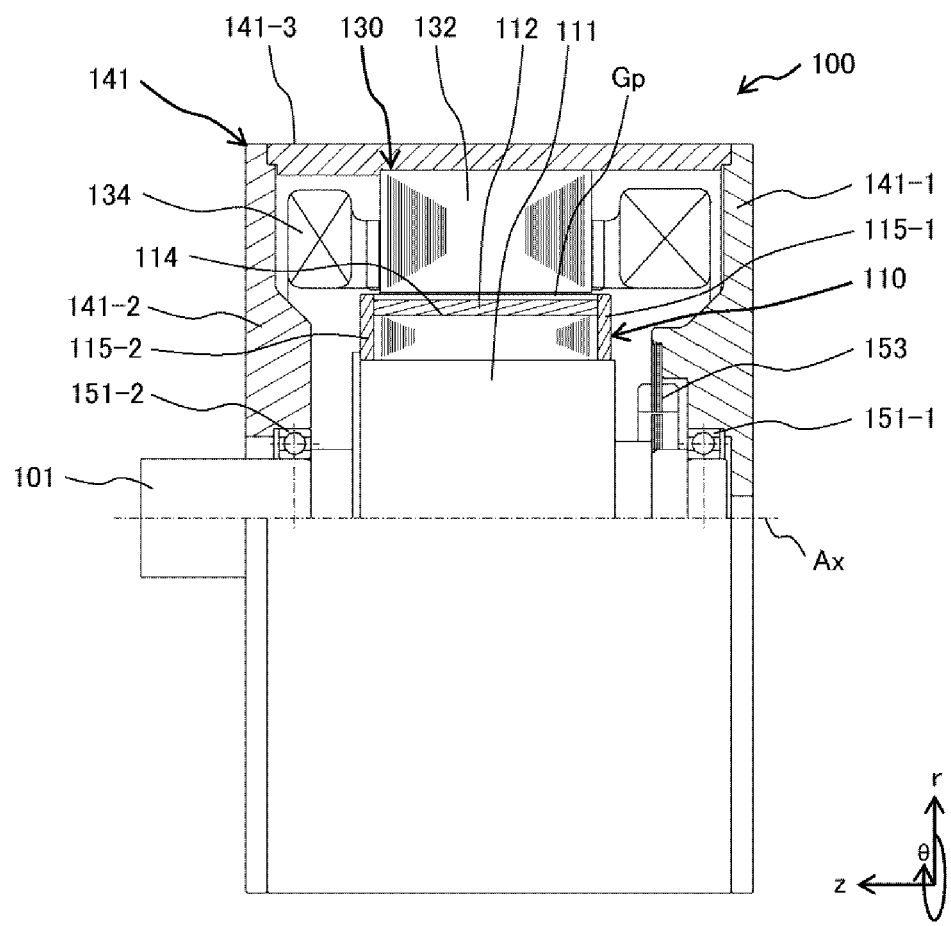
FIG. 1 is a cross-sectional view (r-z cross-sectional view), which is parallel to and includes a central axis Ax, of a rotary electric machine 100 according to the present invention.

FIG. 1 is a cross-sectional view (r-z cross-sectional view), which is parallel to and includes the central axis Ax, of the rotary electric machine 100 according to the present invention. FIG. 2 is a cross-sectional view (lateral cross-sectional view), which is perpendicular to the central axis Ax, of the rotary electric machine 100 according to the present invention, and is a view showing an arrangement of a stator 130, the rotor 110, and the rotating shaft 101, which are main components.

The rotary electric machine 100 according to the present embodiment is suitable for use as, for example, a traveling motor of an electric vehicle that travels by power of only the rotary electric machine or a hybrid electric vehicle that is driven by both an engine and the rotary electric machine.

The rotary electric machine 100 includes the stator 130, the rotor 110, and a housing 141. The stator 130 is held inside the housing 141, and includes a stator core 132 and a stator winding 134. The rotor 110 is disposed on an inner peripheral side of the stator core 132 in a rotatable manner with a gap Gp therebetween. Regarding the stator 130 of FIG. 2, illustration of configurations of the stator winding 134 and the slot or the like around which the stator winding 134 is wound is omitted.

The rotor 110 includes a rotor core 111 fixed to the rotating shaft 101, a plurality of permanent magnets 112 constituting a plurality of poles (magnetic poles), and end plates 115-1, 115-2 made of non-magnetic material, and is rotatable about the rotating shaft 101. In the present embodiment, the number of poles of the rotor is eight, and the permanent magnets 112 of eight poles are arranged in the circumferential direction in the rotor core 111, but the number of poles is not limited to eight. Hereinafter, the permanent magnets 112 will be referred to as magnets.

The rotor core 111 mainly serves to constitute a magnetic path and a strength member, and in many cases, is made by stacking thin electromagnetic steel sheets. When the rotor core 111 is formed by stacking the thin sheets, the axial direction z coincides with the direction of the stacking thickness of the thin sheets. The end plates 115-1, 115-2 are structural members arranged at both axial end portions of the rotor core 111 to fix the electromagnetic steel sheets (stacked steel sheets) forming the rotor core 111 in the axial direction. The rotating shaft 101 may also be referred to as a drive shaft or shaft.

The housing 141 includes a pair of end brackets 141-1, 141-2, which are provided with bearings 151-1, 151-2, and a side surface portion 141-3, and contains the stator 130 and the rotor 110. The rotating shaft 101 is integrally formed with the rotor 110 and is held in a rotatable manner by the bearings 151-1, 151-2.

In the present embodiment, it is assumed that the rotary electric machine 100 is driven by a 3-phase alternating current. Thus, the rotating shaft 101 includes a resolver 153 (rotation angle sensor) that detects positions of the poles and a rotation speed of the rotor 110. Based on an output from the resolver 153, a control signal and a drive signal for an unillustrated power module to perform a switching operation are generated in an unillustrated control circuit and an unillustrated drive circuit.

The power module performs the switching operation based on the drive signal, and converts direct current power supplied from a battery 510 (see FIG. 11) into 3-phase alternating current power. The 3-phase alternating current power is supplied to the stator winding (coil) 134, and a rotating magnetic field is generated in the stator core 132. The frequency of the 3-phase alternating current is controlled based on an output value of the resolver 153, and the phase of the 3-phase alternating current with respect to the rotor 110 is also controlled based on the output value of the resolver 153. The stator winding 134 has a U-phase, a V-phase, and a W-phase arranged in a predetermined order in the circumferential direction.

The configuration of the stator winding (U-phase, V-phase, and W-phase) 134 and the configuration of the control circuit, the drive circuit, and the power module for generating the 3-phase alternating current power can be implemented by applying known techniques.

The rotary electric machine 100 of the present embodiment is a rotary electric machine of a type called magnet-embedded motor, and a plurality of holes (magnet insertion holes) 114 for fixing the magnets 112 are provided along the circumferential direction in the vicinity of the outer periphery of the rotor core 111. The magnets 112 are components that generate magnetic flux, and the magnet insertion holes 114 are portions where the magnets 112 are inserted and housed. Hereinafter, the magnet insertion holes 114 will be referred to as magnet insertion portions or magnet housing portions.

Each of the magnet housing portions 114 is a hole formed in the rotor core 111, and in the present embodiment, the magnet housing portion 114 is provided as a through hole extending in the axial direction z with the magnet 112 embedded therein. Note that the magnet housing portion 114 may be provided as a pit that does not penetrate the rotor core 111 in the axial direction z.

Figure 3:
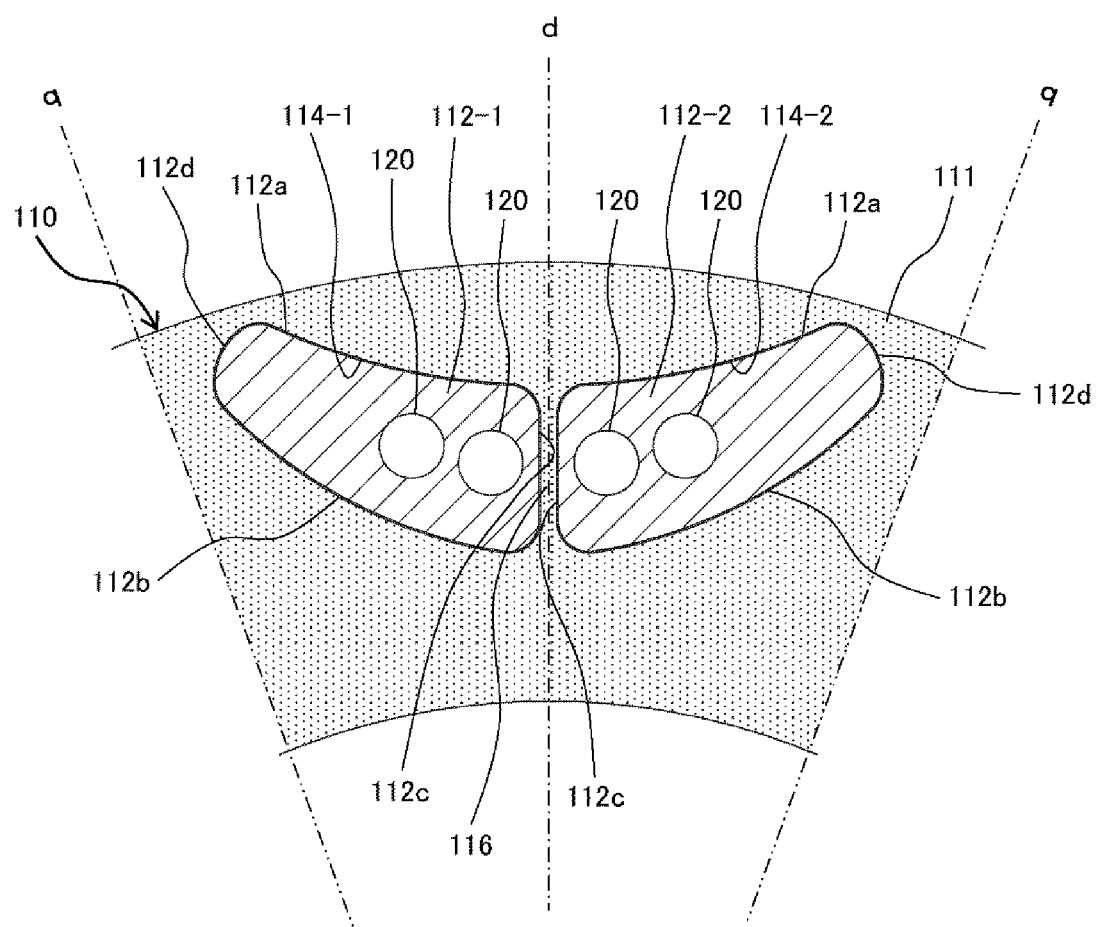
FIG. 3 is a cross-sectional view (lateral cross-sectional view) perpendicular to the central axis Ax, showing a part of a rotor core 111 according to the present invention cut out in a circumferential direction.
Figure 4:
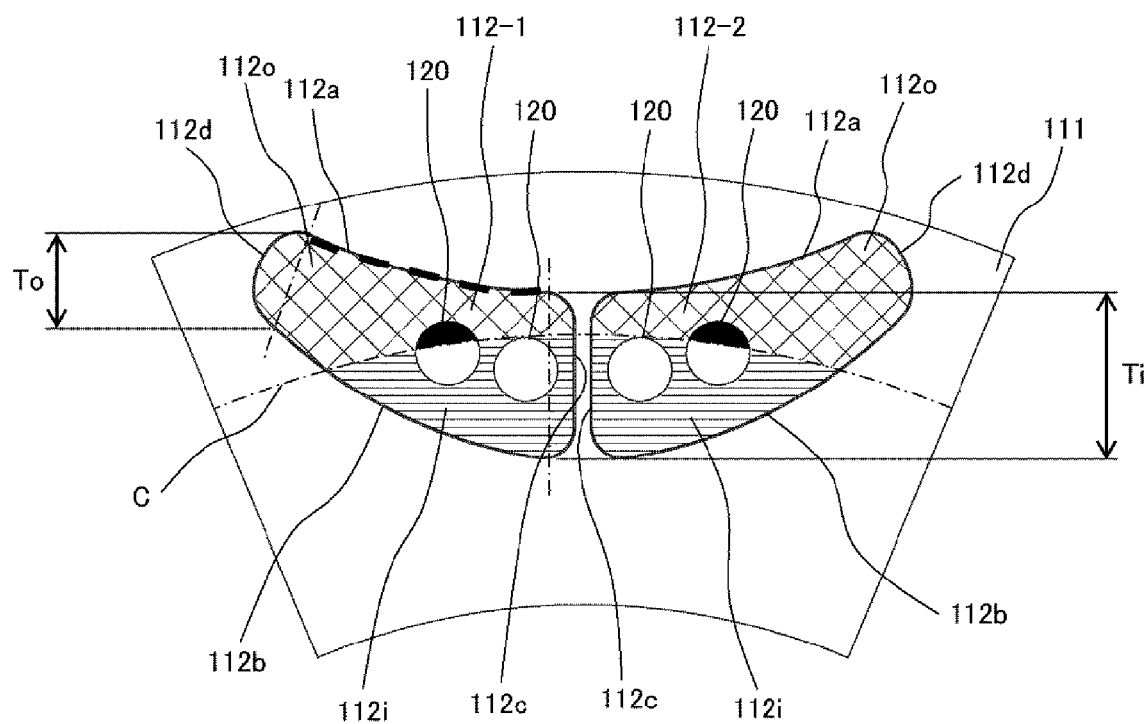
FIG. 4 is a view (lateral cross-sectional view) showing a state where each of magnets 112-1, 112-2 is divided into an outer diameter side region and an inner diameter side region regarding the lateral cross-sectional view shown in FIG. 3.

Next, the magnet housing portion 114 and the magnet 112 will be described in detail with reference to FIGS. 3 and 4. FIG. 3 is a cross-sectional view (lateral cross-sectional view) perpendicular to the central axis Ax, showing a part of the rotor core 111 according to the present invention cut out in the circumferential direction. FIG. 4 is a view (lateral cross-sectional view) showing a state where each of the magnets 112-1, 112-2 is divided into an outer diameter side region and an inner diameter side region regarding the lateral cross-sectional view shown in FIG. 3.

The rotor 110 includes the magnet 112 (112-1, 112-2) and the rotor core 111 having the magnet housing portion (magnet housing space) 114 (114-1, 114-2) for housing the magnet 112 (112-1, 112-2). That is, the magnet housing portion (magnet housing space) 114 (114-1, 114-2) for housing the magnet 112 (112-1, 112-2) is formed in the rotor core 111.

As shown in FIG. 3, in the present embodiment, the magnet 112 constituting one pole is divided into two magnets 112-1, 112-2, and the two magnets 112-1, 112-2 are arranged so as to form a V shape opened to the stator 130 side. For this reason, the magnet housing portion 114 is also divided into two magnet housing portions 114-1, 114-2. In the present embodiment, the two magnet housing portions 114-1, 114-2 form independent spaces that do not communicate with each other.

The magnets 112-1, 112-2 are inserted into and fixed to the magnet housing portions 114-1, 114-2 of the rotor core 111. Each of the magnets 112-1, 112-2 has opposite sides 112a, 112b facing each other as magnetic pole surfaces and opposite sides 112c, 112d connecting the two magnetic pole surfaces 112a, 112b on the lateral cross section of FIG. 3.

The magnetic pole surfaces 112a, 112b are formed as surfaces drawing curves on the lateral cross section of FIG. 3. In the present embodiment, the magnetic pole surfaces 112a, 112b have arc shapes (arc surfaces) with different curvatures. In the radial direction of the rotor 110 and the rotor core 111, the magnetic pole surface 112a is disposed on the outer side in the radial direction with respect to the magnetic pole surface 112b, and the magnetic pole surface 112b is disposed on the inner side in the radial direction with respect to the magnetic pole surface 112a. That is, the magnetic pole surface 112a is disposed on the stator 130 side, and the magnetic pole surface 112b is disposed on the rotating shaft 101 side (the side opposite to the stator).

The opposite sides 112c, 112d are end surfaces in the circumferential direction of the arc shape of the magnets 112-1, 112-2. In the circumferential direction of the rotor 110 and the rotor core 111, the end surface 112c is disposed on a d-axis side, and the end surface 112d is disposed on a q-axis side. In the end surface 112c, an intermediate portion between the two magnetic pole surfaces 112a, 112b is formed in a flat surface shape, and portions connected to the magnetic pole surfaces 112a, 112b are formed as curved surfaces which are curved on the lateral cross section of FIG. 3. In the end surface 112d, the entire portion between the two magnetic pole surfaces 112a, 112b is formed as a curved surface which is curved on the lateral cross section. In the present embodiment, the curved surfaces of the end surface 112c and the end surface 112d have arc shapes.

Since the two magnets 112-1, 112-2 are arranged in a V shape, a central portion between the two magnetic pole surfaces 112a, 112b in the end surface 112d is located radially outward of a central portion between the two magnetic pole surfaces 112a, 112b in the end surface 112c. In other words, the central portion between the two magnetic pole surfaces 112a, 112b in the end surface 112c is located radially inward of the central portion between the two magnetic pole surfaces 112a, 112b of the end surface 112d.

In the present embodiment, an aspect in which the magnets 112-1, 112-2 are constituted by bonded magnets will be described.

However, the magnets 112-1, 112-2 are not limited to bonded magnets, and other magnets such as sintered magnets, ferrite magnets or the like may be used.

The magnets (bonded magnets) 112-1, 112-2 are formed of a resin bonding material (binding material) and magnetic powder (magnetic material), and have flexibility in the shape of the magnets to be formed. Therefore, it is possible to realize a shape that is close to the ideal in terms of electrical and strength. Particularly, in the present embodiment, bonded magnets are suitable for forming an axial space 120 and the shape of the magnets 112-1, 112-2.

The two magnet housing portions 114-1, 114-2 may be formed in one space, communicating with each other, and in this case, a convex portion (magnet support portion) may be provided at a position corresponding to a dividing portion 116 which separates the two magnet housing portions 114-1, 114-2 in FIG. 3, wherein the convex portion protrudes from the inner peripheral surface of the magnet housing portion toward the inside of the space and supports the two magnets 112-1, 112-2 in a manner of separating the two magnets 112-1, 112-2 from each other. In carrying out the present invention, it is not necessary to divide the magnet 112 into the two magnets 112-1, 112-2, and the magnet 112 may have a shape in which the two magnets 112-1, 112-2 are integrated.

In the present embodiment, the molded bonded magnets 112-1, 112-2 are inserted into the magnet housing portions 114-1, 114-2, but the material of the bonded magnets 112-1, 112-2 may be injected into the magnet housing portions 114-1, 114-2 to perform insert molding. When the molded bonded magnets 112-1, 112-2 are inserted into the magnet housing portions 114-1, 114-2, gaps are formed between the inner peripheral surfaces of the magnet housing portions 114-1, 114-2 and the outer peripheral surfaces of the bonded magnets 112-1, 112-2. On the other hand, when the material of the bonded magnets 112-1, 112-2 is injected into the magnet housing portions 114-1, 114-2 to perform insert molding, no gap is formed between the inner peripheral surfaces of the magnet housing portions 114-1, 114-2 and the outer peripheral surfaces of the magnets 112-1, 112-2, and the inner peripheral surfaces of the magnet housing portions 114-1, 114-2 are in close contact to the outer peripheral surfaces of the magnets 112-1, 112-2.

As shown in FIG. 4, in a lateral cross section perpendicular to the axial direction z of the rotating shaft 101, the magnets 112-1, 112-2 are arranged such that a q-axis side portion is located on the outer diameter side with respect to a d-axis side portion, and a magnet thickness Ti on the inner diameter side (d-axis side) of the rotor core 111 is formed to be larger than a magnet thickness To on the outer diameter side (q-axis side) of the rotor core 111. That is, the magnet thickness To on the outer diameter side and the magnet thickness Ti on the inner diameter side have a relation of To<Ti.

In the present description, the magnetic thicknesses Ti, To are defined as dimensions between the magnetic pole surfaces 112a and 112b in a direction perpendicular to the magnetic pole surface 112a on the outer peripheral side of the magnets 112-1, 112-2.

As described above, since the central portion of the end surface 112c between the two magnetic pole surfaces 112a, 112b is located radially inward of the central portion of the end surface 112d between the two magnetic pole surfaces 112a, 112b, the magnets 112-1, 112-2 are thick on the inner diameter side (Ti) and thin on the outer diameter side (To), and the magnet thickness is formed to be uneven.

The axial space 120, which is formed along the axial direction z, is formed in the magnets 112-1, 112-2. In the present embodiment, the axial space 120 is formed as a hole, and two holes (axial spaces) 120 are formed in the rotor core 111. Here, the hole (axial space) 120 is not limited to a through hole. In addition, the axial space 120 may be constituted by one hole. Further, in the present embodiment, the axial space 120 is a hole having a circular lateral cross section, but the lateral cross section is not limited to a circular shape.

Since the axial space 120 is provided as a through hole, the axial space 120 can be used as a refrigerant flow path through which a gaseous or liquid refrigerant flows, as will be described later. When the axial space 120 is used as a refrigerant flow path, the magnets 112-1, 112-2 are directly cooled by the refrigerant, and thus, the temperature rise of the magnets 112-1, 112-2 can be suppressed. The coercive force of the magnets 112-1, 112-2 can be improved by suppressing the temperature rise.

When the magnets 112-1, 112-2 are fixed to the magnet housing portions 114-1, 114-2 with an adhesive or a mold, it is desirable to seal the axial space 120 to prevent the adhesive or resin from entering the axial space 120.

The axial space 120 is formed such that when the lateral cross section of each of the magnets 112-1, 112-2 is divided into an outer diameter side region 112o and an inner diameter side region 112i in a manner that the lateral cross section areas including the cross section of the axial space 120 are equal to each other with a circumference C around the rotation center as a boundary, a space density of the axial space 120 in the inner diameter side region 112i is larger than a space density of the axial space 120 in the outer diameter side region 112o. In FIG. 4, the portion of the axial space 120 occupying the inner diameter side region 112i is shown in white, and the portion of the axial space 120 occupying the outer diameter side region 112o is shown in black.

Particularly, in the present embodiment, all the axial spaces 120 provided in the magnets 112-1, 112-2 are arranged so as to be biased to the inner diameter side (d-axis side) where the magnet thickness is large. Note that in the magnets 112-1, 112-2 of the present embodiment, two axial spaces 120 are provided for one magnet.

Here, with reference to FIGS. 5 and 6, a description will be given of a relation between the magnetic thickness Ti on the inner diameter side (d-axis side) and the magnetic thickness To on the outer diameter side (q-axis side), and the space density of the axial space 120 in the inner diameter side region 112i and the space density of the axial space 120 in the outer diameter side region 112o.

Figure 5:
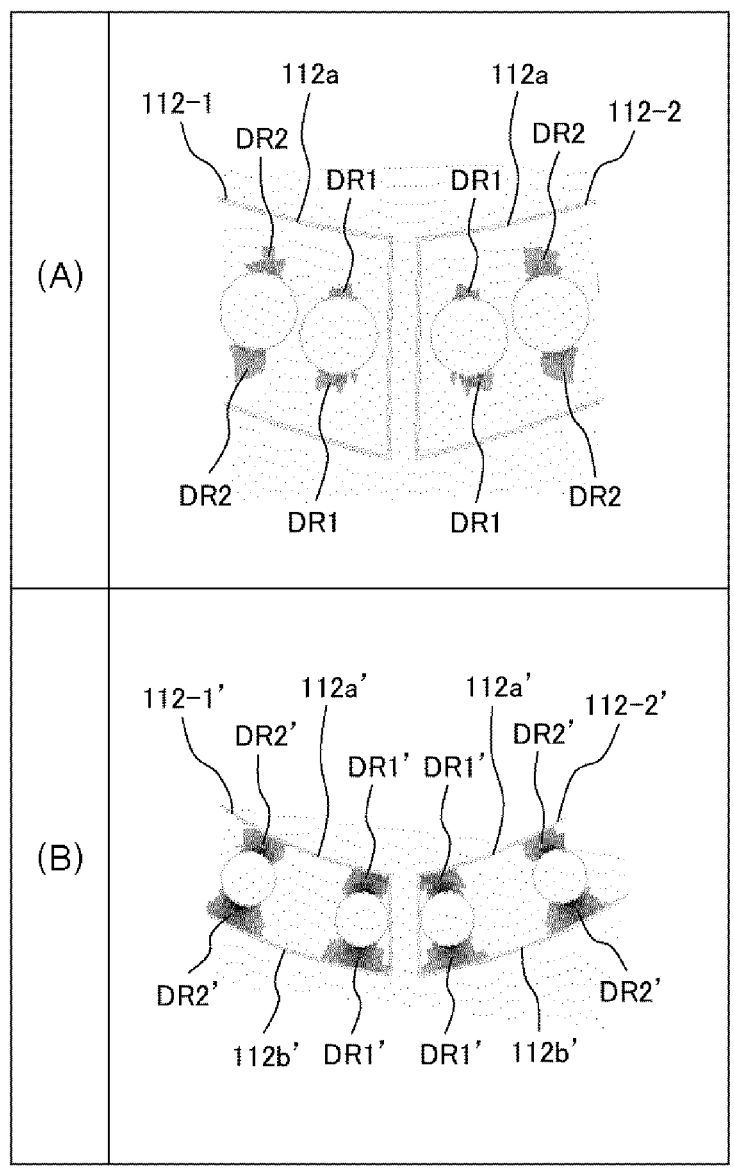
FIG. 5 is a view showing calculation results of a demagnetization rate in a magnet of a comparative example and a demagnetization rate in a magnet of the present embodiment.

FIG. 5 is a view showing calculation results of a demagnetization rate in a magnet of a comparative example and a demagnetization rate in the magnet of the present embodiment. In FIG. 5, lateral cross sections of the magnets 112-1, 112-2, 112-1', 112-2' arranged on the rotor core 111 are illustrated.

In FIG. 5, demagnetization occurs in the portions painted in gray, and particularly, demagnetization rate is larger in the darker portions. (A) shows the demagnetization rates in the magnets 112-1, 112-2 of the present embodiment, and slight demagnetization DR1, DR2 occur between the axial space 120, and the magnetic pole surfaces 112a and 112b, and the demagnetization is limited to the vicinity of the axial space 120. In the present embodiment, the magnet thickness is also larger in the portion where the axial space 120 is provided, and the demagnetization rate can be reduced.

(B) shows the demagnetization rates in the magnets 112-1', 112-2' of the comparative example, and the magnets 112-1', 112-2' of the comparative example have a uniform thickness in the lateral cross sections. In the magnets 112-1', 112-2', demagnetization DR1', DR2' occur in a range from an axial space 120 to a magnetic pole surface 112a' and a magnetic pole surface 112b', and the demagnetization rate is larger in the vicinity of the axial space 120. In the present comparative example, the magnet thickness is smaller and the demagnetization rate is larger particularly in the portion where the axial space 120 is provided.

From FIG. 5, it can be seen that demagnetization can be reduced by increasing the thickness of the magnet in the portion where the axial space 120 is arranged. Thus, it can be seen that the demagnetization occurring in the magnets 112-1, 112-2 can be reduced by configuring the space density of the axial space 120 on the inner diameter side (d-axis side), where the magnet thickness is increased, to be larger than the space density of the axial space 120 on the outer diameter side (q-axis side), where the magnet thickness is decreased. That is, the magnets 112-1, 112-2 of the present embodiment can improve the demagnetization resistance and the coercive force.

Figure 6:
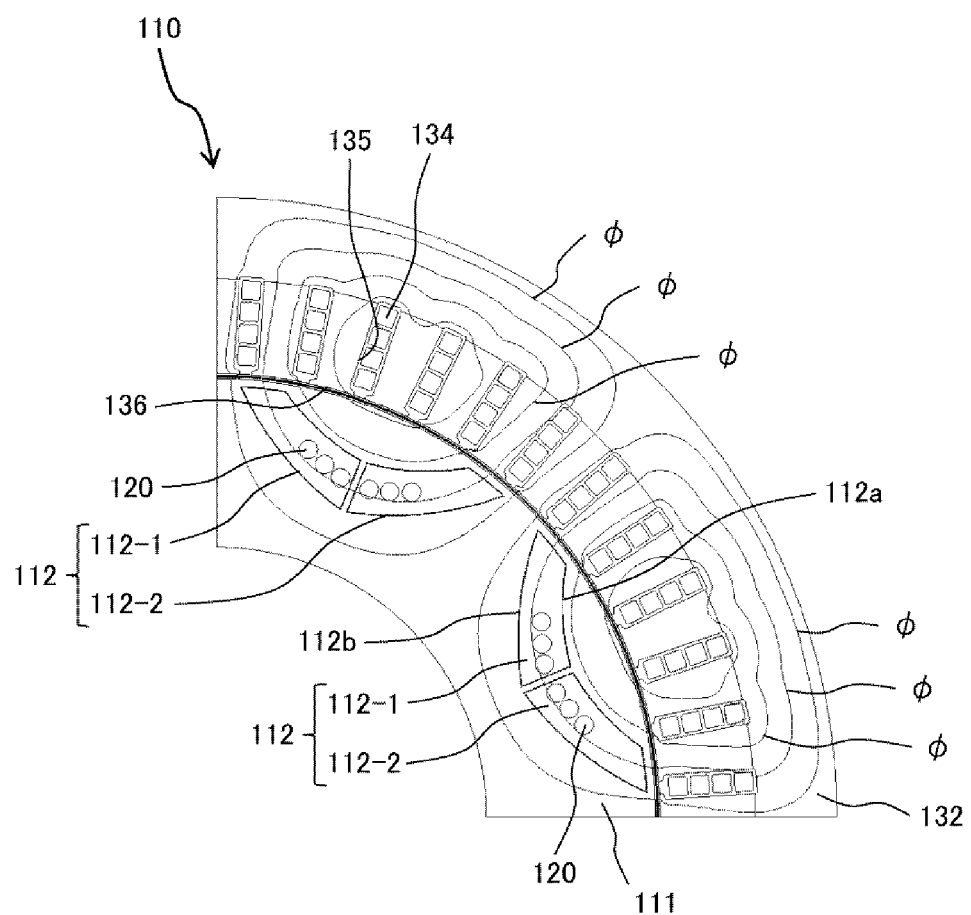
FIG. 6 is a view showing magnetic flux lines Φ generated in a stator core 132 and the rotor core 111 of the present embodiment.

FIG. 6 is a view showing magnetic flux lines Φ generated in the stator core 132 and the rotor core 111 of the present embodiment. In FIG. 6, a lateral cross section of the stator core 132 and the rotor core 111 is illustrated.

As can be seen from FIG. 6, the magnets 112-1, 112-2 are arranged in a V shape, and the magnet thickness Ti on the inner diameter side (d-axis side) is formed to be larger than the magnet thickness To on the outer diameter side (q-axis side), so that the magnetic flux lines Φ are generated along the magnetic pole surfaces 112a, 112b of the magnets 112-1, 112-2. In order to effectively utilize a reluctance torque, it is desirable to arrange the magnets 112a, 112b along the magnetic flux lines Φ. In the present embodiment, since the magnets 112-1, 112-2 are arranged along the magnetic flux lines Φ, the reluctance torque can be effectively utilized and the maximum torque of the rotary electric machine 100 can be improved.

As described above, in the present embodiment, the rotor 110 has the following configuration.

The configuration includes the magnets 112-1, 112-2 and the rotor core 111 that forms the magnet housing portions (magnet housing spaces) 114-1, 114-2 which house the magnets 112-1, 112-2, wherein in the lateral cross section perpendicular to the axial direction of the rotating shaft 101, the magnets 112-1, 112-2 are arranged such that the q-axis side portion is located on the outer diameter side with respect to the d-axis side portion, and the magnet thickness Ti on the inner diameter side (d-axis side) of the rotor core 111 is formed to be larger than the magnet thickness To on the outer diameter side (q-axis side) of the rotor core 111, the axial space 120 formed along the axial direction is formed in the magnets 112-1 and 112-2, and the axial space 120 is formed such that when the aforementioned lateral cross section of each of the magnets 112-1, 112-2 is divided into the outer diameter side region 112o and the inner diameter side region 112i in a manner that the lateral cross section areas including the cross section of the axial space 120 are equal to each other with the circumference C around the rotation center as the boundary, the space density of the axial space 120 in the inner diameter side region 112i is larger than the space density of the axial space 120 in the outer diameter side region 112o.

In the rotor 110 of the present embodiment, the demagnetization resistance is improved by increasing the thickness of the magnets 112-1, 112-2 at the position where the axial space 120 is provided.

In this case, it is preferable that the magnets 112-1, 112-2 are constituted by bonded magnets.

A bonded magnet is formed by injection molding using a resin bonding material (binding material) and magnetic powder (magnetic material), has great flexibility in shape, and can easily provide the axial space 120 compared to a sintered magnet.

The rotary electric machine 100 of the present embodiment includes: the stator 130 having the stator core 132, and the rotor 110 which is disposed on the inner peripheral side of the stator core 132 in a rotatable manner with the gap Gp therebetween, wherein the above-described rotor 110 is provided as the rotor 110. Accordingly, the rotary electric machine 100 of the present embodiment has a magnet arrangement capable of effectively utilizing the reluctance torque, thereby improving the maximum torque.

Modification 1

Figure 7:
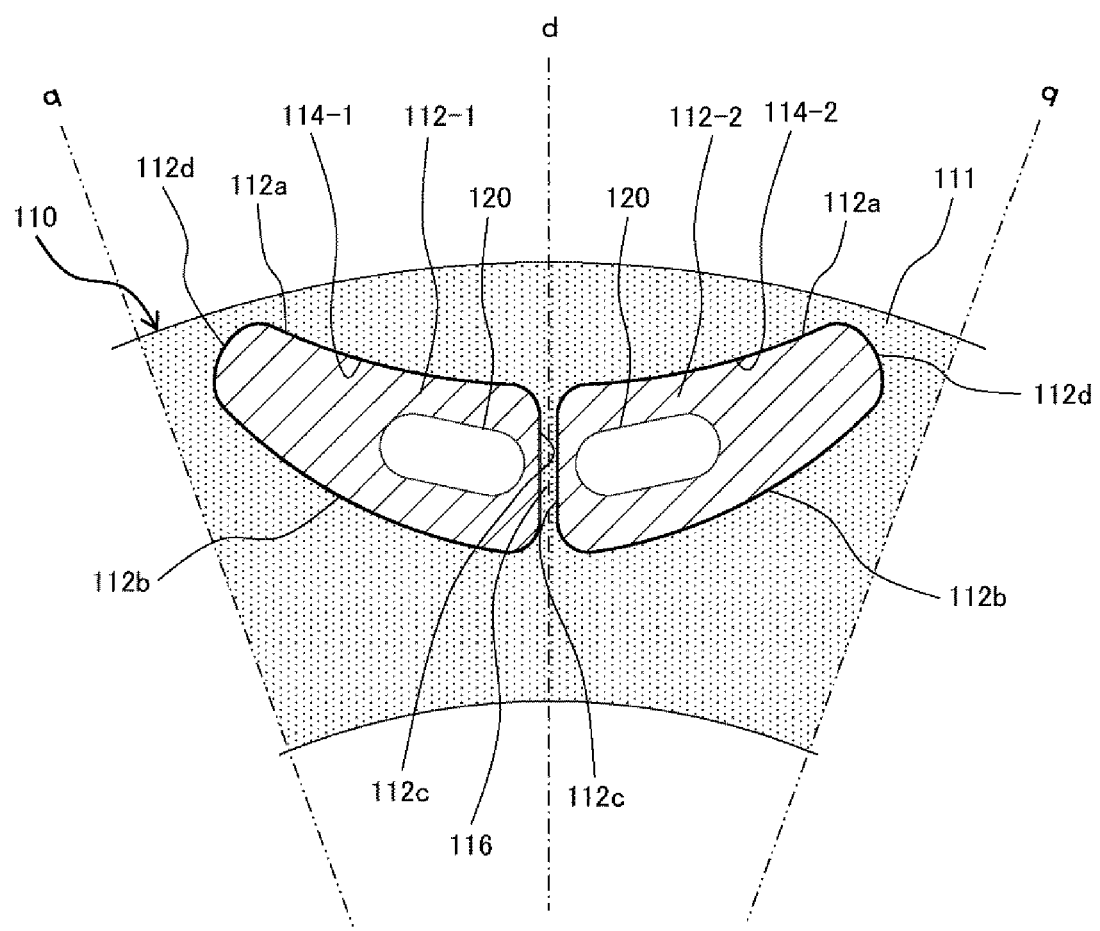
FIG. 7 is a cross-sectional view (lateral cross-sectional view) perpendicular to the central axis Ax, showing a modification (first modification) of the rotor core 111 according to the present invention by cutting out a part of the rotor core 111 in the circumferential direction.

A modification of Embodiment 1 will be described with reference to FIG. 7. FIG. 7 is a cross-sectional view (lateral cross-sectional view) perpendicular to the central axis Ax, showing the modification (first modification) of the rotor core 111 according to the present invention by cutting out a part of the rotor core 111 in the circumferential direction.

In the present modification, the shape of the axial space 120 is changed from that of Embodiment 1. Other configurations are the same as those of Embodiment 1. In FIG. 7, configurations corresponding to the configurations described in Embodiment 1 are denoted by the same reference signs as those in Embodiment 1.

In Embodiment 1, the axial space (through hole) 120 has a circular shape in the lateral cross section. The shape of the axial space 120 in the lateral cross section is not limited to the circular shape and may be an oval shape as shown in FIG. 7. In the present description, the oval shape is not limited to the shape shown in FIG. 7 and includes an elliptical shape and an egg shape.

That is, it is preferable that the axial space 120 has a circular shape or an oval shape including an elliptical shape and an egg shape in the lateral cross section. By making the axial space (through hole) have a shape with few corners such as a circular shape or an oval shape in the lateral cross section, the pressure distribution can be made uniform, and the strength of the magnets 112-1, 112-2 is improved.

Modification 2

Figure 8:
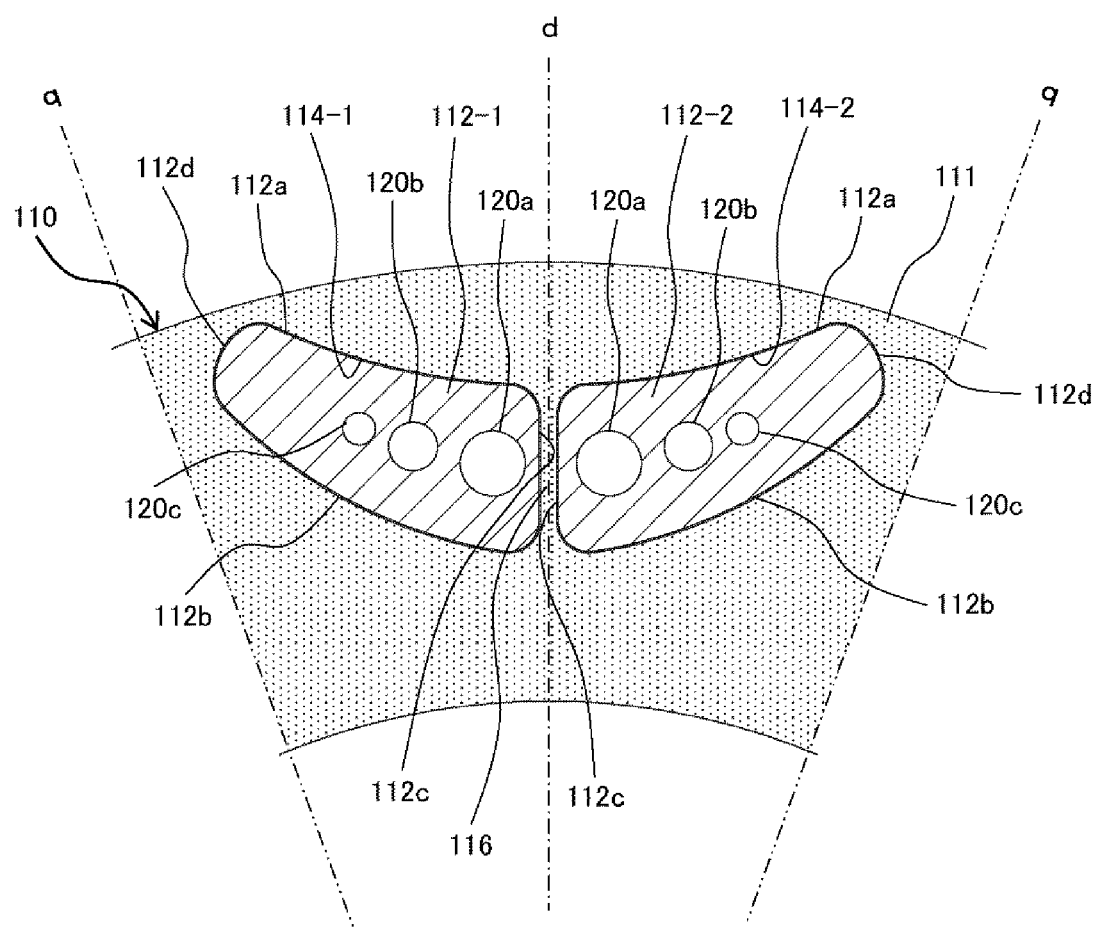
FIG. 8 is a cross-sectional view (lateral cross-sectional view) perpendicular to the central axis Ax, showing a modification (second modification) of the rotor core 111 according to the present invention by cutting out a part of the rotor core 111 in the circumferential direction.

A modification of Embodiment 1 will be described with reference to FIG. 8. FIG. 8 is a cross-sectional view (lateral cross-sectional view) perpendicular to the central axis Ax, showing the modification (second modification) of the rotor core 111 according to the present invention by cutting out a part of the rotor core 111 in the circumferential direction.

In the present modification, the configuration of the axial space 120 is changed from that of Embodiment 1. Other configurations are the same as those of Embodiment 1. In FIG. 8, configurations corresponding to the configurations described in Embodiment 1 are denoted by the same reference signs as those in Embodiment 1.

In Embodiment 1, the axial space 120 is constituted by a hole group including two holes. However, the axial space 120 is not limited to two holes. In the present modification, the axial space 120 is constituted by three holes 120a, 120b, 120c. The three holes 120a, 120b, 120c are configured in the same manner as the axial space 120 of Embodiment 1. The axial space 120 may be constituted by a hole group including four or more holes.

In Embodiment 1, an aspect in which the axial space 120 is constituted by one hole is also described, but it is preferable that the axial space 120 is constituted by a hole group including two or more holes. In this case, the cross section area of the axial space 120 is the sum of the cross section areas of the plurality of holes constituting the hole group. By making the axial space 120 a hole group including a plurality of holes, the diameter of each hole can be reduced, and the flexibility of the layout of the holes is improved. In this case, the hole group 120 is configured such that an area Sin of the hole group occupying the inner diameter side region 112i and an area Sout of the hole group occupying the outer diameter side region 112o satisfy Sin>Sout.

In this case, it is preferable that the axial space 120 is constituted by a hole group in which the hole diameter of each of the holes 120b, 120c becomes smaller as each hole is arranged on a further outer diameter side with respect to the hole 120a arranged on the inner diameter side. By making the hole diameter of each of the holes 120 smaller as each hole is arranged on a further outer diameter side, the thickness of the magnets 112-1, 112-2 can be made substantially uniform, and the coercive force can be made uniform by suppressing a decrease in the coercive force.

Modification 3

Figure 9:
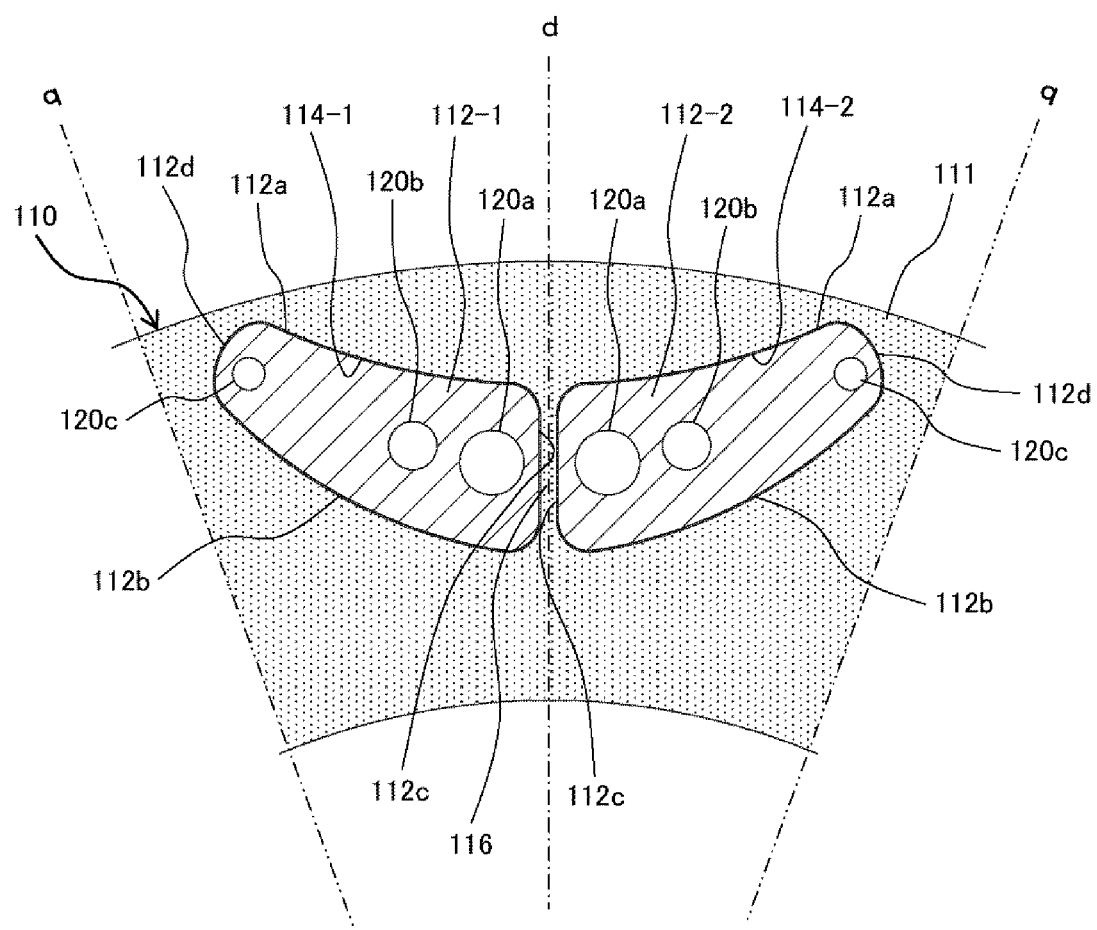
FIG. 9 is a cross-sectional view (lateral cross-sectional view) perpendicular to the central axis Ax, showing a modification (third modification) of the rotor core 111 according to the present invention by cutting out a part of the rotor core 111 in the circumferential direction.

A modification of Embodiment 1 will be described with reference to FIG. 9. FIG. 9 is a cross-sectional view (lateral cross-sectional view) perpendicular to the central axis Ax, showing the modification (third modification) of the rotor core 111 according to the present invention by cutting out a part of the rotor core 111 in the circumferential direction.

In the present modification, the configuration of the axial space 120 is changed from that of Embodiment 1, and the configuration of the axial space 120 of Modification 2 is further changed from that of Embodiment 1. Other configurations are the same as those of Embodiment 1 or Modification 2. In FIG. 9, configurations corresponding to the configurations described in Embodiment 1 and Modification 2 are denoted by the same reference signs as those in Embodiment 1 and Modification 2.

In Modification 2, the hole 120c arranged on the outermost diameter side may be arranged away from the other holes 120a, 120b. Accordingly, when the holes 120a, 120b, 120c are configured as flow paths of refrigerant and a refrigerant is caused to flow through the holes 120a, 120b, 120c, it is possible to reduce a temperature difference generated in the magnets 112-1, 112-2. In other words, the embodiment according to the present invention does not deny that the hole constituting the axial space 120 is arranged at the end portion on the outer diameter side (q-axis side) of the magnets 112-1, 112-2.

In this case as well, the hole group 120 is configured such that the area Sin of the hole group occupying the inner diameter side region 112i and the area Sout of the hole group occupying the outer diameter side region 112o satisfy Sin>Sout.

Embodiment 2

Figure 10:
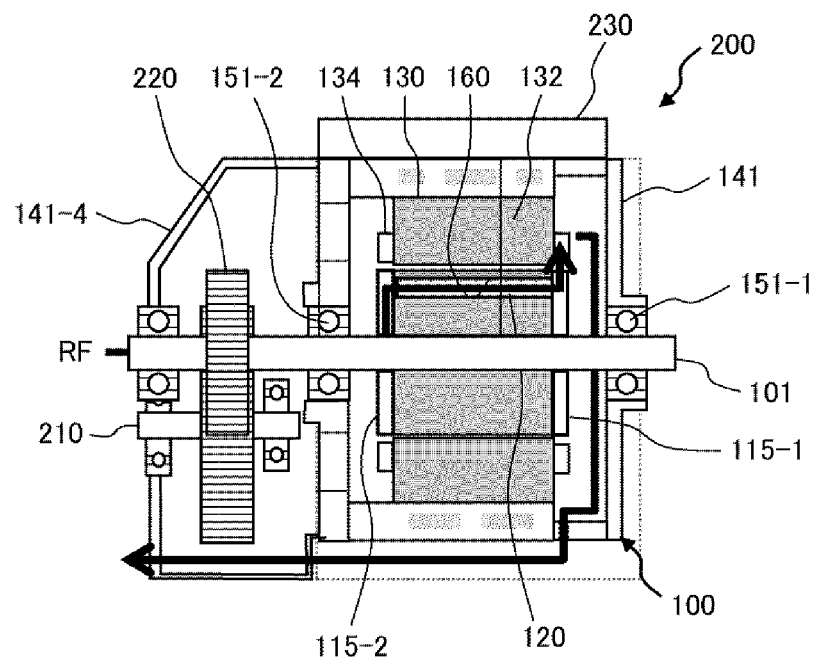
FIG. 10 is a longitudinal cross-sectional view of an electric drive device 200 using the rotary electric machine 100 according to one embodiment of the present invention as a driving power source.
Figure 11:
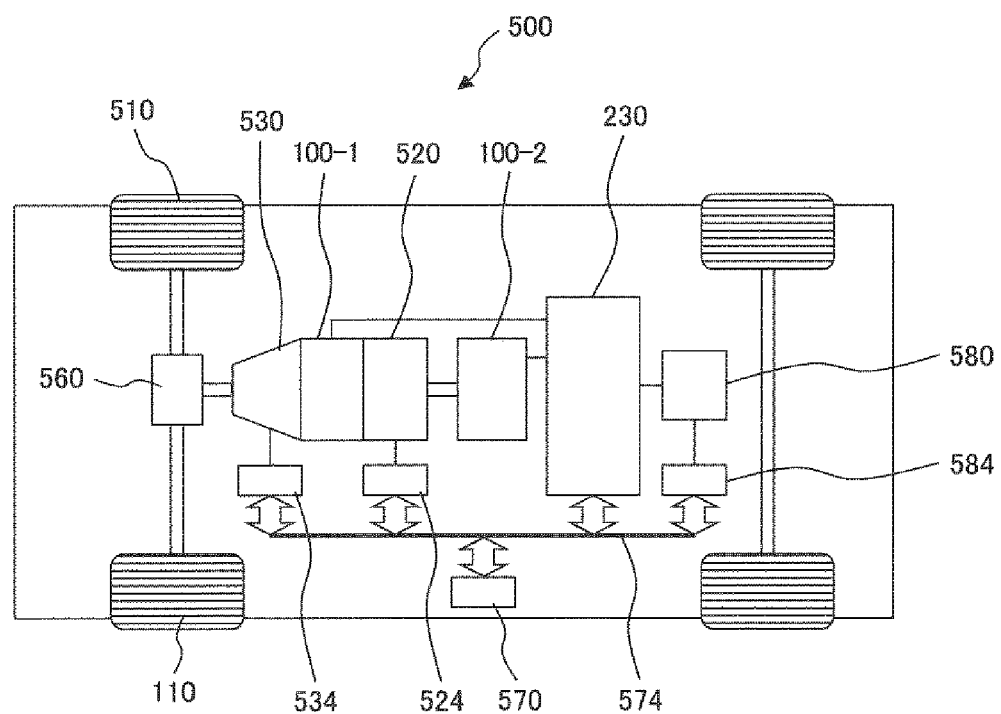
FIG. 11 is a view showing a schematic configuration of a hybrid electric vehicle 500 equipped with the rotary electric machine 100 according to one embodiment of the present invention.

In the present embodiment, an electric vehicle equipped with the rotary electric machine 100 will be described with reference to FIGS. 10 and 11. FIG. 10 is a longitudinal cross-sectional view of an electric drive device 200 using the rotary electric machine 100 according to one embodiment of the present invention as a driving power source. FIG. 11 is a view showing a schematic configuration of a hybrid electric vehicle 500 equipped with the rotary electric machine 100 according to one embodiment of the present invention. In FIGS. 10 and 11, configurations corresponding to the configurations described in Embodiment 1 (including modifications) are denoted by the same reference signs as those in Embodiment 1.

The rotary electric machine 100 according to Embodiment 1 can be applied to the drive device 200 for a pure electric vehicle that travels by power of only the rotary electric machine or a hybrid electric vehicle that is driven by both an engine and the rotary electric machine, and hereinafter, the hybrid electric vehicle will be described as an example.

Hereinafter, the hybrid electric vehicle 500 will be referred to as the vehicle.

As shown in FIG. 10, the electric drive device 200 includes the rotary electric machine 100, an output shaft (drive shaft) 210, a gear 220 provided between the output shaft 210 and the rotating shaft 101 of the rotary electric machine 100, and a power converter 230. In the present embodiment, the gear 220 is housed inside a housing 141-4. In the present embodiment, the power converter 230 is integrated with the rotary electric machine 100.

The electric drive device 200 of the present embodiment is used as the driving power source for the vehicle 500, and includes the rotary electric machine and the power converter, in which the rotary electric machine 100 described in Embodiment 1 (including modifications) is provided as the rotary electric machine. Thus, an electric drive device having an improved coercive force can be realized.

In addition, the electric drive device 200 of the present embodiment uses the axial space 120 as the refrigerant flow path through which a refrigerant RF flows, and circulates the refrigerant RF in the rotary electric machine 100. The refrigerant flow path is configured as the inside of the rotating shaft 101→the end plate 115-2→the axial space 120 of the magnets 112-1,112-2→the end plate 115-1→a coil end of the coil 134→the outside of the rotary electric machine 100.

The refrigerant RF is a substance that absorbs heat generated in the rotary electric machine, and a fluid such as oil or a gas such as air can be used as the refrigerant RF. The refrigerant RF is often oil (ATF) so that insulation can be maintained when the refrigerant RF is injected inside the rotary electric machine 100.

The cooling of the refrigerant RF may be performed by providing a chiller which is not illustrated, and in the case of the vehicle 500, traveling wind may be used. For the circulation of the refrigerant RF, a pump which is not illustrated may be used, or a force generated by the rotation of the rotary electric machine 100 may be used.

As described above, in the electric drive device 200 of the present embodiment, the axial space 120 constitutes the refrigerant flow path, and the rotary electric machine 100 is configured to be capable of being cooled by the refrigerant flowing through the axial space 120. This makes it possible to directly cool the magnets 112-1, 112-2 and to reduce the magnet temperature. Thus, the coercive force of the magnets 112-1, 112-2 is further improved. In addition, it is possible to reduce the internal temperature of the rotary electric machine 100 (the temperature of the coil, the core, or the like) and to increase the efficiency of the rotary electric machine 100 and thus the efficiency of the electric drive device 200.

As shown in FIG. 11, an engine 520, a first rotary electric machine 100-1, a second rotary electric machine 100-2, and a battery 580 are equipped in the vehicle 500. The battery 580 supplies direct current power to the first rotary electric machine 100-1 and the second rotary electric machine 100-2 via the power converter 230 when the vehicle 500 requires driving force from the first rotary electric machine 100-1 and the second rotary electric machine 100-2. Although the power converter 230 is illustrated as being separated from the first rotary electric machine 100-1 and the second rotary electric machine 100-2 in FIG. 11, the power converter 230 may be integrated with the first rotary electric machine 100-1 and the second rotary electric machine 100-2 as shown in FIG. 10.

The battery 580 receives direct current power from the first rotary electric machine 100-1 and the second rotary electric machine 100-2 during regenerative traveling. Transmission and reception of direct current power between the battery 580 and the first rotary electric machine 100-1 or the second rotary electric machine 100-2 are performed via the power converter 230. In addition, although not illustrated, a battery that supplies low-voltage power (for example, 14-volt power) is equipped on the vehicle 100 and supplies direct current power to a control circuit to be described below.

Note that the first rotary electric machine 100-1 and the second rotary electric machine 100-2 have substantially the same structure, and can be configured by the above-described rotary electric machine 100.

Rotational torque generated by the first rotary electric machine 100-1 or the second rotary electric machine 100-2 and the engine 520 is transmitted to front wheels 510 via a transmission 530 and a differential gear 560. The transmission 530 is controlled by a transmission control device 534. The engine 520 is controlled by an engine control device 524. The battery 580 is controlled by a battery control device 584. The transmission control device 534, the engine control device 524, the battery control device 584, the power converter 600, and an integration control device 570 are connected to each other via a communication line 574.

The integration control device 570 is a higher-level control device than the transmission control device 534, the engine control device 524, the power converter 230, and the battery control device 584, and receives information indicating the state of each of the transmission control device 534, the engine control device 524, the power converter 230, and the battery control device 584 from each of them via the communication line 574. The integration control device 570 calculates control commands to each device based on the acquired information on each device. The calculated control commands are transmitted to each device via the communication line 574.

The battery 580 is constituted by a rechargeable battery such as a lithium-ion battery or a nickel-metal hydride battery, and outputs direct current power of a high voltage, which is from 250 volts to 600 volts or higher. The battery control device 584 outputs a charging and discharging status of the battery 580 and a status of each unit cell constituting the battery 580 to the integration control device 570 via the communication line 574.

When it is determined that the battery 580 needs to be charged based on the information from the battery control device 584, the integration control device 570 instructs the power converter 230 to start a power generation operation. The integration control device 570 mainly manages output torques of the engine 520, the first rotary electric machine 100-1, and the second rotary electric machine 100-2, calculates the total torque and the torque distribution ratios of the output torque of the engine 520 and the output torques of the first rotary electric machine 100-1 and the second rotary electric machine 100-2, and transmits control commands based on the calculation results to the transmission control device 534, the engine control device 524, and the power converter 600. The power converter 230 controls the first rotary electric machine 100-1 and the second rotary electric machine 100-2 based on the torque commands from the integration control device 570 so as to generate torque output or power as commanded.

The power converter 230 is provided with power semiconductors constituting inverter circuits for operating the first rotary electric machine 100-1 and the second rotary electric machine 100-2. The power converter 230 controls switching operations of the power semiconductors based on commands from the integration control device 570. The switching operations of the power semiconductors allow the first rotary electric machine 100-1 and the second rotary electric machine 100-2 to operate as electric motors or as generators.

When the first rotary electric machine 100-1 and the second rotary electric machine 100-2 operate as electric motors, direct current power from the high-voltage battery 580 is supplied to direct current terminals of the inverters of the power converter 230. The power converter 230 controls the switching operations of the power semiconductors to convert the supplied direct current power into 3-phase alternating current power, and supplies the converted power to the first rotary electric machine 100-1 and the second rotary electric machine 100-2. On the other hand, when the first rotary electric machine 100-1 and the second rotary electric machine 100-2 operate as generators, the rotors of the first rotary electric machine 100-1 and the second rotary electric machine 100-2 are rotationally driven by rotational torques applied from the outside, and 3-phase alternating current power is generated in the stator windings of the first rotary electric machine 100-1 and the second rotary electric machine 100-2. The generated 3-phase alternating current power is converted into direct current power by the power converter 230, and the direct current power is supplied to the battery 580, thereby charging the high-voltage battery 580.

Note that the present invention is not limited to the above-described embodiments, and various modifications are possible.

For example, the above-described embodiments have been described in detail in order to clearly describe the present invention, and the present invention is not necessarily limited to an aspect including all the described configurations. In addition, a part of the configurations of the embodiments may be deleted, or other configurations may be added.

REFERENCE SIGNS LIST

100 Rotary electric machine
101 Rotating shaft
110 Rotor
111 Rotor core
112, 112-1, 112-2 Magnet 112*i* Inner diameter side region in the lateral cross section of the magnets 112-1, 112-2
112*o* Outer diameter side region in the lateral cross section of the magnets 112-1, 112-2
114, 114-1, 114-2 Magnet housing portion (magnet housing space)
120 Axial space
120*a*, 120*b*, 120*c* Holes constituting the axial space 120
130 Stator
132 Stator core
200 Electric drive device
500 Vehicle
Gp Gap

The invention claimed is:

1. A rotor of a rotary electric machine, the rotor comprising: a magnet; and a rotor core that has a magnet housing portion which houses the magnet,
   wherein
   in a lateral cross section perpendicular to an axial direction of a rotating shaft, the magnet is arranged such that a q-axis side portion is located on an outer diameter side with respect to a d-axis side portion, and a magnet thickness on an inner diameter side of the rotor core is formed to be larger than a magnet thickness on an outer diameter side of the rotor core,
   an axial space formed along the axial direction is formed in the magnet, and
   the axial space is formed such that when the lateral cross section of the magnet is divided into an outer diameter side region and an inner diameter side region in a manner that lateral cross section areas including a cross section of the axial space are equal to each other with a circumference around a rotation center as a boundary, a space density of the axial space in the inner diameter side region is larger than a space density of the axial space in the outer diameter side region.

2. The rotor of a rotary electric machine according to claim 1, wherein
   the magnet is constituted by a bonded magnet.

3. The rotor of a rotary electric machine according to claim 1, wherein
   the axial space has a circular shape or an oval shape including an elliptical shape and an egg shape in a lateral cross section.

4. The rotor of a rotary electric machine according to claim 1, wherein
   the axial space is constituted by a hole group including two or more holes.

5. The rotor of a rotary electric machine according to claim 4, wherein
   the axial space is constituted by a hole group in which hole diameter of each hole becomes smaller as each hole is arranged on an outer diameter side with respect to a hole arranged on an inner diameter side.

6. A rotary electric machine, comprising: a stator that has a stator core; and a rotor that is disposed on an inner peripheral side of the stator core in a rotatable manner with a gap therebetween, wherein
   the rotor of a rotary electric machine according to claim 1 is provided as the rotor.

7. An electric drive device used as a driving power source, the electric drive device comprising:
   a rotary electric machine; and a power converter, wherein
   the rotary electric machine according to claim 6 is provided as the rotary electric machine.

8. The electric drive device according to claim 7, wherein
   the axial space constitutes a refrigerant flow path, and
   the rotary electric machine is configured to be capable of being cooled by a refrigerant flowing through the axial space.

* * * * *